(12) United States Patent
Hu et al.

(10) Patent No.: US 11,535,737 B2
(45) Date of Patent: Dec. 27, 2022

(54) THERMALLY CONDUCTIVE POLYVINYL HALIDE

(71) Applicant: GEON Performance Solutions, LLC, Westlake, OH (US)

(72) Inventors: Ling Hu, Westlake, OH (US); Sang Lee, Avon, OH (US)

(73) Assignee: GEON Performance Solutions, LLC, Westlake, OH (US)

( * ) Notice: Subject to any disclaimer, the term of this patent is extended or adjusted under 35 U.S.C. 154(b) by 0 days.

(21) Appl. No.: 16/484,361

(22) PCT Filed: Feb. 2, 2018

(86) PCT No.: PCT/US2018/016623
§ 371 (c)(1),
(2) Date: Aug. 7, 2019

(87) PCT Pub. No.: WO2018/148116
PCT Pub. Date: Aug. 16, 2018

(65) Prior Publication Data
US 2020/0002521 A1    Jan. 2, 2020

Related U.S. Application Data
(60) Provisional application No. 62/457,079, filed on Feb. 9, 2017.

(51) Int. Cl.
| | | |
|---|---|---|
| *C08L 27/06* | (2006.01) | |
| *C08K 3/04* | (2006.01) | |
| *C08K 5/09* | (2006.01) | |
| *C08K 7/18* | (2006.01) | |
| *C08L 91/00* | (2006.01) | |

(52) U.S. Cl.
CPC ............... *C08L 27/06* (2013.01); *C08K 3/04* (2013.01); *C08K 5/09* (2013.01); *C08K 7/18* (2013.01); *C08L 91/00* (2013.01); *C08L 2201/02* (2013.01); *C08L 2203/20* (2013.01)

(58) Field of Classification Search
CPC .......... C08L 27/06; C08L 91/00; C08K 3/04; C08K 5/09; C08K 7/18
See application file for complete search history.

(56) References Cited

U.S. PATENT DOCUMENTS

| | | | | |
|---|---|---|---|---|
| 2,883,307 | A | * | 4/1959 | Orr, Jr. .................... H01B 1/18 427/122 |
| 2,996,489 | A | | 8/1961 | Dannis et al. |
| 3,399,104 | A | * | 8/1968 | Ball, III .................... C08K 3/04 428/116 |
| 4,714,665 | A | * | 12/1987 | Siegel ................. H01M 10/052 429/307 |
| 5,244,700 | A | | 9/1993 | Banschick |
| 5,607,764 | A | | 3/1997 | Konno et al. |
| 5,939,272 | A | | 8/1999 | Buechler et al. |
| 6,846,182 | B1 | | 1/2005 | Sibner |
| 6,878,436 | B2 | | 4/2005 | Reilly et al. |
| 6,904,154 | B2 | | 6/2005 | Azima et al. |
| 7,297,380 | B2 | | 11/2007 | Coenjarts et al. |
| 7,338,184 | B2 | | 3/2008 | Chen et al. |
| 7,344,903 | B2 | | 3/2008 | Erchak et al. |
| 7,433,565 | B2 | | 10/2008 | Joseph et al. |
| 7,582,720 | B2 | | 9/2009 | Rudiger et al. |
| 7,809,441 | B2 | | 10/2010 | Kane et al. |
| 7,922,859 | B2 | | 4/2011 | Rosenberger |
| 8,415,695 | B2 | | 4/2013 | Lenk |
| 8,499,793 | B2 | | 8/2013 | Park et al. |
| 8,641,214 | B1 | | 2/2014 | Batchko |
| 8,674,390 | B2 | | 3/2014 | Harris et al. |
| 8,861,072 | B2 | | 10/2014 | Arsenault et al. |
| 8,921,827 | B2 | | 12/2014 | Pickett et al. |
| 8,981,405 | B2 | | 3/2015 | Lenk |
| 9,304,232 | B2 | | 4/2016 | Chen et al. |
| 9,575,359 | B2 | | 2/2017 | Theiste et al. |
| 2008/0194736 | A1 | | 8/2008 | Lu |
| 2008/0218659 | A1 | | 9/2008 | Kanaya et al. |
| 2009/0161221 | A1 | | 6/2009 | Yang et al. |
| 2009/0256993 | A1 | | 10/2009 | Oku |

(Continued)

FOREIGN PATENT DOCUMENTS

| | | | |
|---|---|---|---|
| CN | 101977976 A | 2/2011 | |
| CN | 103554782 | * 2/2014 | .............. C08L 27/06 |

(Continued)

OTHER PUBLICATIONS

Office Communication for CA App. No. 3,049,688 dated Aug. 27, 2020.
International Search and Written Opinion for International Application No. PCT/US2018/016623 dated May 16, 2018.
International Preliminary Report on Patentability for International Application No. PCT/US2018/016623 dated Aug. 13, 2019.
[No Author Listed], TSR9000 Spherical Silicone Resin. Momentive Performance Materials Inc. Copyright 2016-2019. 4 pages.
PCT/US2018/016623, May 16, 2018, International Search Report and Written Opinion.

(Continued)

*Primary Examiner* — John E Uselding
(74) *Attorney, Agent, or Firm* — Wolf, Greenfield & Sacks, P.C.

(57) ABSTRACT

A polyvinyl halide compound has thermal conductivity and includes polyvinyl halide resin, natural or synthetic graphite of flake or spheroid form, and at least 0.5 weight percent of epoxidized vegetable oil. Selection of types and amounts of graphite and epoxidized vegetable oil provide thermal conductivity while other desirable properties of the compound are suitably maintained. The compound can be used for making any end use article that needs flame retardance and good thermal management and is especially useful as a thermally conductive material to replace die cast or extruded aluminum heat sinks in industrial applications, such as LED lighting fixtures.

39 Claims, No Drawings

(56) References Cited

U.S. PATENT DOCUMENTS

| | | |
|---|---|---|
| 2009/0279175 A1 | 11/2009 | Laney et al. |
| 2009/0284970 A1 | 11/2009 | Graf et al. |
| 2009/0316261 A1 | 12/2009 | Garcia-Leiner et al. |
| 2010/0149644 A1 | 6/2010 | Kogure et al. |
| 2011/0014298 A1 | 1/2011 | Friel et al. |
| 2011/0042700 A1 | 2/2011 | Lenk |
| 2011/0103021 A1 | 5/2011 | Janssen et al. |
| 2011/0121196 A1 | 5/2011 | Yeo et al. |
| 2011/0147614 A1 | 6/2011 | Kane et al. |
| 2012/0083560 A1 | 4/2012 | Lin et al. |
| 2012/0181489 A1 | 7/2012 | Garcia-Leiner et al. |
| 2013/0229824 A1 | 9/2013 | Jeoung et al. |
| 2014/0080951 A1 | 3/2014 | Raman et al. |
| 2014/0178513 A1 | 6/2014 | Matthews |
| 2015/0103557 A1 | 4/2015 | Ayoub et al. |
| 2016/0377239 A1 | 12/2016 | Kwong |
| 2018/0085977 A1 | 3/2018 | Ezaki |
| 2019/0079219 A1 | 3/2019 | Wu et al. |

FOREIGN PATENT DOCUMENTS

| | | | | |
|---|---|---|---|---|
| CN | 104327405 A | | 2/2015 | |
| CN | 104534191 | * | 4/2015 | ............. F16L 9/147 |
| CN | 104558960 | * | 4/2015 | ............. C08L 27/06 |
| CN | 105218981 | * | 1/2016 | ............. C08L 27/06 |
| CN | 105670174 | * | 6/2016 | ............. C08L 27/06 |
| CN | 106496858 A | | 3/2017 | |
| EP | 0 931 259 A2 | | 7/1999 | |
| EP | 2751199 B1 | | 1/2017 | |
| GB | 1196543 | * | 6/1970 | ............. B29D 31/00 |
| JP | 59-081349 A | | 5/1984 | |
| JP | 2008-120848 A | | 5/2008 | |
| JP | 2009-068019 A | | 4/2009 | |
| JP | 2017-179008 A | | 10/2017 | |
| KR | 10-2001-0080806 A | | 8/2001 | |
| KR | 101355714 B1 | | 1/2014 | |
| WO | WO 98/15825 A2 | | 4/1998 | |
| WO | WO 2016/057420 A1 | | 4/2016 | |
| WO | WO 2016/120760 A1 | | 8/2016 | |
| WO | WO 2016/194361 A1 | | 12/2016 | |
| WO | WO 2019/079194 A2 | | 4/2019 | |

OTHER PUBLICATIONS

PCT/US2018/016623, Aug. 13, 2019, International Preliminary Report on Patentability.

Office Communication for CN Application No. 201880010499.0 dated Feb. 23, 2021.

Office Action for CN Application No. 201880010499.9 dated Jan. 11, 2022.

Office Action for CN Application No. 201880010499.0 dated May 20, 2022.

* cited by examiner

THERMALLY CONDUCTIVE POLYVINYL HALIDE

CLAIM OF PRIORITY

This application is a national stage filing under 35 U.S.C. § 371 of International Patent Application Serial No. PCT/US2018/016623, filed Feb. 2, 2018, which claims the benefit of U.S. Provisional Patent Application Ser. No. 62/457,079, filed on Feb. 9, 2017, each of which is hereby incorporated by reference in its entirety.

FIELD OF THE INVENTION

This invention relates to formulations of non-plasticized polyvinyl halide, particularly rigid polyvinyl chloride, useful as a thermally conductive material to replace die cast or extruded aluminum heat sinks in industrial applications, such as LED lighting fixtures.

BACKGROUND OF THE INVENTION

People benefit from plastic articles. From their invention in the mid-20th Century until the present, thermoplastic polymers have become the composition of many consumer products. Such products are relatively lightweight, sturdy, and corrosion resistant.

Rigid poly(vinyl chloride) has been a top performing plastic resin for decades. Billions of kilograms of poly(vinyl chloride) (also known as "PVC") resin are molded and extruded each year into countless products. With conventional additives, poly(vinyl chloride) provides unparalleled durability, flame resistance, chemical resistance, weatherability, electrical properties, and clarity to name a few.

Light emitting diodes ("LEDs") are rapidly becoming popular for interior and exterior lighting because of their lower energy consumption as compared with incandescent lamps.

LEDs are produced in commercial quantities at a variety of color temperatures. A typical display of LEDs on sale in a commercial retail store includes LEDs in the range of "Soft White" (2700 K); "Warm White" (3000 K); "Bright White" (3500 K); and "Daylight" (5000 K), where the color temperature from 2700-5000 is measured in degrees Kelvin.

LEDs are point sources of light, intense in origin of their luminosity and very adversely affected by high temperatures generated by the electronic circuitry during use.

Lighting fixtures and many other articles for interior spaces where human occupation is possible need materials which are flame retardant sufficiently to meet or exceed regulatory and industrially managed standards. PVC is naturally flame retardant.

SUMMARY OF THE INVENTION

What is needed is a cost-effective PVC with for use in LED general lighting fixtures having a thermal conductivity target greater than 1.0 W/(m·K) (in-plane) to replace die cast and extruded aluminum heat sinks in such lighting fixtures. PVC without additives providing thermal conductivity has only about 0.1 W/(m·K) of thermal conductivity values. It is desirable to strive for as high a thermal conductivity as is practicable.

Polyvinyl halide, especially PVC, because of its properties stated above would be a good candidate if made thermally conductive enough for use as heat sinks and other components for LED lighting fixtures.

What the art needs is a rigid polyvinyl halide material which can be inexpensively made and acceptably used as thermally conductive extruded or molded thermoplastic part in LED lighting fixtures.

It has been found that choice of rigid polyvinyl halide with a thermally conductive additive and a coupling agent can provide an acceptable thermally conductive, naturally flame retardant polymer for lighting and other interior electronic fixtures.

The choice of rigid PVC combined with thermally conductive filler and a coupling agent such as epoxidized vegetable oil can also be molded, or extruded or compression molded into a low/no porosity thermally conductive part.

One aspect of this disclosure is a polyvinyl halide compound having thermal conductivity, comprising (a) polyvinyl halide resin; (b) natural or synthetic graphite of flake or spheroid form; and (c) at least 0.5 weight percent of epoxidized vegetable oil.

Another aspect of this disclosure is a polymer article made of the compound identified above.

Features of the invention will become apparent with reference to the following embodiments. There exist various refinements of the features noted in relation to the above-mentioned aspects of the present invention. Additional features may also be incorporated in the above-mentioned aspects of the present invention. These refinements and additional features may exist individually or in any combination. For instance, various features discussed below in relation to any of the described aspects of the present invention may be incorporated into any of the described aspects of the present invention alone or in any combination.

EMBODIMENTS OF THE INVENTION

Polyvinyl Halide Resins

Any polyvinyl halide capable of being sufficiently flexible is a candidate for use in this invention as thermoplastic resin. Polyvinyl halides are advantageous because they have inherent flame retardant properties arising from the presence of halide moieties which naturally retard onset and continuity of combustion in the presence of oxygen.

Polyvinyl halides are essentially a homopolymer or copolymer of vinyl halide, particularly chloride, with minor amounts of other co-monomers, if any. The most common polyvinyl halide is polyvinyl chloride (PVC) which is one of most common types of thermoplastic used from the mid-20$^{th}$ Century to the present.

PVC comprises polymerized vinyl chloride monomer where preferred polymers are essentially homopolymerized vinyl chloride with little or no copolymerized co-monomers. Useful co-monomers, if desired, include mono-unsaturated ethylenically unsaturated monomer copolymerizable with vinyl chloride monomer by addition polymerization. Useful co-monomers include other vinyl monomers such as vinyl acetate, ethers, and vinylidene chloride. Other useful co-monomers comprise mono-ethylenically unsaturated monomers including acrylics such as lower alkyl acrylates or methacrylates, acrylic and methacrylic acid, lower alkenyl olefins, vinyl aromatics such as styrene and styrene derivatives, and vinyl esters and ethers. Typical useful commercial co-monomers include acrylonitrile, 2-ethylhexyl acrylate, vinylidene chloride, and isobutyl ether. Useful PVC and CPVC copolymers can contain from about 0.1% to about 10% or 15%, preferably from about 0.5% to about 5%, by weight of copolymerized co-monomer.

A particular embodiment of PVC is CPVC, or chlorinated PVC, where PVC containing approximately 57% chlorine is further reacted with chlorine radicals produced from chlorine gas dispersed in water and irradiated to generate chlorine radicals dissolved in water to produce CPVC, a polymer with a higher glass transition temperature (Tg) and heat distortion temperature. Commercial CPVC typically contains by weight from about 58% to about 70% and preferably from about 63% to about 68% chlorine.

CPVC copolymers can be obtained by chlorinating such PVC copolymers using conventional methods such as that described in U.S. Pat. No. 2,996,489, which is incorporated herein by reference.

Preferred PVCs as starting materials are suspension polymerized vinyl chloride, although less preferred mass (bulk) polymerized can be useful. Rigid PVCs are distinguished from flexible PVCs in that former contain essentially no plasticizer.

Useful weight average molecular weights of PVCs and CPVCs can be from about 39,000 to about 150,000, and preferably from about 55,000 to about 109,000, where the molecular weight is measured by size exclusion chromatography and correlated to absolute PVC molecular weights determined by Perkins et al., Journal of Vinyl Technology, Vol. 15, No. 2 (1993).

The PVC or CPVC resin can have an inherent viscosity from about 0.5 to about 0.95 for injection molding grades and from about 0.5 to about 1.2 for extrusion and compression molding grades, as measured by using 0.2 grams of resin in 100 ml of cyclohexanone at 30 degrees C. by ASTM D1243.

The PVCs or CPVCs of this invention have a K Value ranging from about 50 to about 60 and preferably from about 50 to about 56.

Commercially available PVC resins can be used meeting the specifications stated above. Non-limiting sources of commercial PVC resin are ShinTech of Houston, Tex. USA; Kaneka Texas Corporation of Pasadena, Tex., USA; and Oxyvinyls, LLC of Dallas, Tex., USA.

Commercially available CPVC resins can be used meeting the specifications stated above. Non-limiting sources of commercial CPVC resin are Sekisui America Corporation of New York, N.Y., USA; Kaneka Texas Corporation of Pasadena, Tex., USA; and Lubrizol Corporation of Brecksville, Ohio, USA.

Graphite Thermally Conductive Additive

After consideration and experimentation, it was found that graphite can provide suitable thermally conductivity to the polyvinyl halide resin, especially PVC and CPVC. Graphite can have thermal conductivity of from about 140 to about 500 W/(m·K). Graphite in either spheroid or flake form is not particularly abrasive against polymer processing machinery surfaces.

Both flake and spheroid graphite are useful, as demonstrated in the examples below. Commercially available graphite includes:

Flake: Timrex 80×150 graphite, Timrex SFG-150 graphite, and Timrex C-Therm 011 graphite from Imerys.

Spheroid: Timrex KS-44 graphite and Timrex KS-150 graphite also available from Imerys.

The amount of graphite present in the compound can range from about 15 to about 65 wt. % and preferably from about 30 to about 55 wt. % of the compound.

Epoxidized Vegetable Oil Coupling Agent

Any vegetable oil which has been substantially fully epoxidized (i.e., an "epoxidized vegetable oil") is a candidate to serve as a coupling agent for the mixing of the graphite with the polyvinyl halide compound during melt compounding.

Non-limiting examples of vegetable oils are oils derived from vegetable seeds, such as canola oil (iodine value about 100-115), corn oil (iodine value about 118-128), linseed oil (iodine value about 170-200), rapeseed oil (iodine value about 100-115), safflower oil (iodine value about 140-150), soybean oil (iodine value about 120-143), sunflower oil (iodine value about 125-140), tall oil (iodine value about 140-190), and tung oil (iodine value about 180) and mixtures thereof. Other vegetable oils include almond, argan, borage, castor, coconut, cotton, flax, grape, hemp, jojoba, macadamia, mango, mustard, neem, oil palm, sesame, shea, tonka bean, and mixtures of any of them with themselves or any one or more of the first list.

Among the many vegetables oils, to demonstrate the efficacy of epoxidized vegetable oil as a coupling agent, use of epoxidized soybean oil (ESO) was found to greatly improve melt compounding processing to achieve the polymer compound having little porosity. Air is an excellent insulator, both electrically and thermally. Presence of air in pores of an extruded or molded polyvinyl halide compound will reduce thermal conductivity properties.

ESO, as an exemplar for an epoxidized vegetable oil listed above, has been found to dramatically and unexpectedly reduce porosity otherwise occurring with a melt mixing of large quantities of graphite into polyvinyl halide. The ESO wets the surfaces of the graphite, whether in flake or spheroid shape, to render the graphite physically compatible with the polyvinyl halide, thereby improving both compounding processability and dispersion of the graphite throughout the volume of the polyvinyl halide in final extruded or molded shape.

The amount of epoxidized vegetable oil present in the compound can be 0.5 wt. % or higher and preferably from about 1 to about 6 wt. % of the compound.

Commercially available sources of epoxidized vegetable oils include Arkema, marketing under the brand Vikoflex® for ESO and epoxidized linseed oil grades. As the market grows for sustainable epoxy plasticizers from renewable resources, the number of commercially available epoxidized vegetable oils listed above will increase in number and will reduce in cost.

Other Optional Additives

The compound of the present invention can include conventional plastics additives in an amount that is sufficient to obtain a desired processing or performance property for the compound, so long as there is resulting no light transmission percentage in the panel lower than the light transmission percentage of the polyvinyl halide and the visible light refracting particles.

The amount of any optional additive should not be wasteful of the additive or detrimental to the processing or performance of the compound. Those skilled in the art of thermoplastics compounding, without undue experimentation but with reference to such treatises as *Plastics Additives Database* (2004) from Plastics Design Library (www.elsevier.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; plasticizers; processing aids; release agents; silanes, titanates and zirconates; slip and anti-blocking agents; stabilizers; stearates; ultraviolet light absorbers; viscosity regulators; waxes; and combinations of them.

Processing of the Polyvinyl Halide Compound

The preparation of compounds of the present invention is uncomplicated. The compound of the present invention can be made in batch or continuous operations, for later injection or compression molding, or extrusion. The selection of post-processing final shaping steps needs to be known at the time of formulating in order to select the preferred PVC grade, as explained above.

Mixing in a continuous process typically occurs in an extruder that is elevated to a temperature that is sufficient to melt the polymer matrix with addition either at the head of the extruder or downstream in the extruder of the solid ingredient additives. Extruder speeds can range from about 50 to about 500 revolutions per minute (rpm), and preferably from about 100 to about 300 rpm. Typically, the output from the extruder is pelletized for later extrusion or injection or compression molding into polymeric articles.

Mixing in a batch process typically occurs in a Banbury mixer that is also elevated to a temperature that is sufficient to melt the polymer matrix to permit addition of the solid ingredient additives of any optional additive. The mixing speeds range from 60 to 1000 rpm and temperature of mixing can be ambient. Also, the output from the mixer is chopped into smaller sizes, such as pellets or cubes, for later extrusion or injection or compression molding into polymeric articles.

Subsequent extrusion or injection or compression molding techniques are well known to those skilled in the art of thermoplastics polymer engineering. Any of compression molding, injection molding and extrusion can be performed on compounds of the present invention. While one should not expose the thermoplastic compounds to needless heat histories, the preparation of pellets or cubes of the PVC compound is suitable for efficient manufacturing. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (elsevier.com), one can make articles of any conceivable shape and appearance using compounds of the present invention.

Usefulness of the Invention

Any plastic article made by injection molding, compression molding, or extrusion is a candidate for use as an article having appreciably little porosity and good thermal conductivity properties.

Any end use article in need of flame retardance and good thermal management can benefit from use of the compounds of the present invention. LED lighting fixtures are particularly suitable for molded or extruded compounds disclosed herein.

Generally polymer compounds disclosed herein should have the following desired technical performances, as seen in Table 1.

TABLE 1

| Properties | | Target |
|---|---|---|
| Thermal conductivity (W/(m · K)) | In-plane | at least 1.0 |
| | Through-plane | at least 0.5 |
| Processing: | Extrusion | Yes |
| | Injection Molding | Yes |
| | Compression Molding | Yes |
| Flammability (@ 1.5 mm-2.0 mm) | | UL 5 VA |
| Impact (ft-lb/in @ 73° F.) | | 0.3-1.5 |

TABLE 1-continued

| Properties | Target |
|---|---|
| HDT (° C.) @ 66 psi | At least 65 |
| Porosity | Approaching 0% |
| Actual Specific Gravity | 1.50-1.75 |

EXAMPLES

Thermal Conductivity Test Method

For thermal conductivity testing, the samples were spray coated with DGF-123 dry graphite film spray (Miracle Power Products, Cleveland, Ohio USA) and tested in a Netzsch "Nanoflash LFA447" instrument, conforming to ASTM D1461-01 to determine the heat capacity and diffusivity. After measuring heat capacity and diffusivity, both in-plane and through-plane conductivity were calculated according to the following equation and reported in Watts per meter per Kelvin (W/(m·K)):

$$K = \rho * Cp * \alpha$$

where
 $\rho$ is density (g/cm$^3$)
 Cp is heat capacity (J/g° C.)
 $\alpha$ is diffusivity (mm$^2$/s)

The experimental parameters used to collect the data were: temperature: 25° C., Filter: 100, Pulse: long, and Pre-amp and amp: 10×5002 and 10×2520.

Example A—Starting Rigid PVC Dry-Blend Powder Compound

All Examples and Comparative Examples below started with a rigid PVC compound, Example A, having the formulation seen in Table 2, which also includes the processing conditions of dry-blend powder compounding.

TABLE 2

| Ingredient | Example A |
|---|---|
| SUSP RESIN 185 (PAS) (K: 56, 1V: 0.68) from OxyVinyls | 100 |
| Modified Dibutyl Tin Octyl TG from Galata | 2.375 |
| STEARIC ACID as lubricant from Emery Oleochemicals | 0.2 |
| CALCIUM STEARATE from Emery Oleochemicals | 2 |
| EBS Wax Generic Lo TAV used as lubricant from Lonza | 2 |
| Fully Refined Paraffin Wax 165 used as lubricant from Honeywell | 0.2 |
| PARALOID K120N processing aid from Dow | 3 |
| KANEKA FM 40 impact modifier from Kaneka | 6.25 |
| Total, PHR | 116.025 |

| Mixing Procedure | |
|---|---|
| Equipment | Henschel mixer |
| Mixing speed, rpm | low speed |
| Order to addition of Ingredients | PVC resin, stabilizer, lubricants, processing aid and impact modifier |
| Drop Temperature, ° C. | 73 |
| Form of product | Free flowing powder |

Table 3 shows the processing conditions for all Comparative Examples and Examples 2 through 18.

TABLE 3

| Mixing and Milling Procedure | |
| --- | --- |
| Mixing | for each formulation, mixed all ingredients together in a 500 ml of glass container |
| Milling | Two roll mill with 0.125~0.135 in. gap |
| Rear Roll Temperature, ° F. | 366 (185° C.) |
| Front Roll Temperature, ° F. | 361 (183° C.) |
| Time on mill | until thoroughly well fused and mixed |
| Form of product | milled slabs to be compression molded for sample testing |

| Compression Molding Sample Preparation Procedure | |
| --- | --- |
| Sample for Thermal Conductivity and Specific Gravity Measurements | 6" × 6" × 0.125" plaque (15 × 15 × 0.32 cm) |
| Equipment | 150 Ton WABASH 18" × 18" (46 × 46 cm) |

TABLE 3-continued

| | |
| --- | --- |
| Sample thickness | 0.125 inches (0.32 cm) |
| Heating platen Temperature, Top, ° F. | 365~370 (185-188° C.) |
| Heating platen Temperature, Bottom, ° F. | 365~370 (185-188° C.) |
| Pre-heat (cycle time, s) | 5 |
| Ramp (cycle time, s) | 180 |
| Hold (cycle time, s) | 120 |
| Cooling (cycle time, s) | 900 |

Tables 4A and 4B show the formulations and test results of Comparative Example 1 and Examples 2-18, with Example 11 being most preferred because of good heat distortion temperature and good processability. In other words, having a higher ESO loading causes a lower HDT value. While in some circumstances ESO loading can be 0.5 wt. % or higher, it is desirable to be 1.0-4.5 wt. % with preference toward 1.0 wt. % if porosity is minimized.

TABLE 4A

| | Comp. 1 | 2 | 3 | 4 | 5 | 6 | 7 | 8 | 9 |
| --- | --- | --- | --- | --- | --- | --- | --- | --- | --- |
| PVC Compound from Example A, % | 53.7 | 56.3 | 51.3 | 43.6 | 37.9 | 74.4 | 51.3 | 51.3 | 51.3 |
| Timrex 80 × 150 natural flake graphite, % | 46.3 | 38.8 | 44.2 | 52.6 | 58.8 | | | | |
| Timrex C-Therm 011 synthetic flake graphite, % | | | | | | 19.2 | 44.2 | | |
| Timrex KS-150 synthetic spheroid graphite, % | | | | | | | | 44.2 | |
| Timrex SFG-150 synthetic flake graphite, % | | | | | | | | | 44.2 |
| Timrex KS-44 synthetic spheroid graphite, % | | | | | | | | | |
| Epoxidized soybean oil (ESO), % | 0 | 4.9 | 4.5 | 3.8 | 3.3 | 6.4 | 4.4 | 4.5 | 4.5 |
| Total Weight % | 100 | 100 | 100 | 100 | 100 | 100 | 100 | 100 | 100 |
| Test Results | | | | | | | | | |
| In-plane thermal conductivity, W/(m · K) | 9.4 | 3.6 | 8.3 | 13.5 | 15.5 | 2.8 | 27.2 | 2.7 | 10.4 |
| Through-plane thermal conductivity, W/(m · K) | 0.59 | 0.42 | 0.73 | 0.79 | 0.83 | 0.59 | 1.11 | 0.68 | 0.72 |
| Milling Processability | Bad[1] | Good[2] | Good | Good | Good | Good | Good | Good | Good |
| Actual Specific Gravity | 1.59 | 1.56 | 1.61 | 1.69 | 1.73 | 1.41 | 1.61 | 1.60 | 1.60 |
| Porosity[3], % | 3 | 0 | 0 | 0 | 0 | 0.7 | 0 | 0 | 0 |

[1] Bad = Too difficult to be fused to form a milled slab with a lot of powdering materials falling off the two-roll mill during milling
[2] Good = Easily fused to form nicely milled slabs
[3] Porosity is calculated based on specific gravity and theoretical specific gravity which is typical for highly filled thermal plastic composite

TABLE 4B

| | 10 | 11 | 12 | 13 | 14 | 15 | 16 | 17 | 18 |
| --- | --- | --- | --- | --- | --- | --- | --- | --- | --- |
| PVC Compound from Example A, % | 51.3 | 53.0 | 51.3 | 51.3 | 51.3 | 51.3 | 51.3 | 62.4 | 62.4 |
| Timrex 80 × 150 natural flake graphite, % | | 45.6 | 22.1 | 22.1 | | 8.8 | 22.1 | 16.1 | 21.5 |
| Timrex C-Therm 011 synthetic flake graphite, % | | | | | | 8.8 | 22.1 | 16.1 | 10.8 |
| Timrex KS-150 synthetic spheroid graphite, % | | | | 22.1 | 22.1 | 8.8 | | | |
| Timrex SFG-150 synthetic flake graphite, % | | | | | 22.1 | 8.8 | | | |

TABLE 4B-continued

| | Example | | | | | | | | |
|---|---|---|---|---|---|---|---|---|---|
| | 10 | 11 | 12 | 13 | 14 | 15 | 16 | 17 | 18 |
| Timrex KS-44 synthetic spheroid graphite, % | 44.2 | | 22.1 | | | 8.8 | | | |
| Epoxidized soybean oil (ESO), % | 4.5 | 1.4 | 4.5 | 4.5 | 4.5 | 4.5 | 4.5 | 5.4 | 5.4 |
| Total Weight % | 100 | 100 | 100 | 100 | 100 | 100 | 100 | 100 | 100 |
| Test Results | | | | | | | | | |
| In-plane thermal conductivity, W/(m · K) | 7.2 | 9.4 | 3.7 | 6.7 | 7.1 | 6.6 | 20 | 5.6 | 7.6 |
| Through-plane thermal conductivity, W/(m · K) | 0.87 | 0.57 | 0.60 | 0.80 | 0.70 | 0.77 | 1.26 | 0.75 | 0.46 |
| Milling Processability | Good[2] | Good | Good | Good | Good | Good | Good | Good | Good |
| Actual Specific Gravity | 1.61 | 1.63 | 1.61 | 1.61 | 1.59 | 1.61 | 1.61 | 1.50 | 1.51 |
| Porosity[3], % | 0 | 0 | 0 | 0 | 0.3 | 0 | 0 | 0.2 | 0 |

[2]Good = Easily fused to form nicely milled slabs
[3]Porosity is calculated based on specific gravity and theoretical specific gravity which is typical for highly filled thermal plastic composite Table 5 shows the processing conditions for Example 19, which used a Buss continuous mixer in replacement of the milling compounding used with respect to Examples 2-18 and Comparative Example 1.

TABLE 5

| Buss Kneading Continuous Mixing and Compounding/Pelletizing | |
|---|---|
| Equipment | Henschel 150 liter mixer |
| Mixing speed, rpm | Very low speed |
| Order to addition of Ingredients | Example A, ESO, and graphite |
| Drop Temperature, F. | Until well mixed |
| Equipment | 46 mm 20-25 Buss |
| ET RPM | 17.5 |
| KS RPM | 165 |
| KS AMPS | 21 |
| RS RPM | 28 |
| GS RPM | 50 |
| KS Screw Temperature, ° F. | 270 |
| KS Barrel Temperature, ° F. | 290 |
| RS Screw Temperature, ° F. | 270 |
| RS Barrel Temperature, ° F. | 270 |
| GS Screw Temperature, ° F. | 340 |
| GS Barrel Temperature, ° F. | 350 |
| Die Temperature, ° F. | 360 |
| Melt Temperature, ° F. | 375 |
| Product form | pellet |

Table 6 shows the formulation and test results for Example 19.

TABLE 6

| Example | 19 |
|---|---|
| PVC Compound from Example A, wt. % | 53.0 |
| Timrex 80 × 150 natural flake graphite, wt. % | 45.6 |
| Epoxidized soybean oil (ESO), wt. % | 1.4 |
| Total Weight % | 100 |
| Test Results of the Injection Molded Sample | |
| In-plane thermal conductivity, W/(m · K) | 9.0 |
| Through-plane thermal conductivity, W/(m · K) | 1.7 |
| Specific gravity, ASTM D792 | 1.63 |
| Tensile strength (psi) (ASTM D638) | 5899 |
| Tensile modulus (ksi) (ASTM D638) | 2034 |
| Flexural strength (psi) (ASTM D790) | 9678 |
| Flexural modulus (ksi) (ASTM D790) | 2077 |
| Notched Izod impact (ft-lb/in) (ASTM D256) | 0.57 |

TABLE 6-continued

| Example | 19 |
|---|---|
| HDT (° C.) @ 264 psi, annealed (ASTM D648) | 68 |
| HDT (° C.) @ 66 psi, annealed (ASTM D648) | 71 |
| Coefficient of linear expansion, in/in/° F. (ASTM D696) | 7.2 E−06 |
| Flammability UL 94 | V-0 @ 1.6 mm |
| UL 94 | 5 VA @ 1.6 mm |

Table 7 shows the processing conditions for Examples 20-22, which used a Banbury mixer followed by milling compounding in replacement of only Milling compounding used with respect to Examples 2-18 and Comparative Example 1.

TABLE 7

| Banbury Mixing and Milling/Pelletizing | |
|---|---|
| Equipment | Henschel 10 liter mixer |
| Mixing speed, rpm | Very low speed |
| Order to addition of Ingredients | Example A, ESO, and graphite |
| Drop Temperature, F. | Until well mixed |
| Form of product | Free flow powder |
| Equipment | Banbury |
| Mixing speed, rpm | 66 |
| Chamber temperature, ° F. | 340 |
| Drop Temperature, ° F. | 325~330 |
| Two Roll Mill with 0.14 in. gap | |
| Rear Roll Temperature, ° F. | 340 |
| Front Roll Temperature, ° F. | 350 |
| Real Roll Mixing speed, rpm | 17 |
| Front Roll Mixing speed, rpm | 21 |
| Time on mill | Until thoroughly well fused and mixed |
| Form of product | cubes |

Tables 8A-8C show the injection molding, extrusion, and compression molding conditions for each of Examples 20-22.

TABLE 8A

Injection Molding Conditions

| | |
|---|---|
| Equipment | 85 T Van Dorn Molding machine |
| Rear Barrel Temperature, °F. | 345-360 |
| Center Barrel Temperature, °F. | 355-370 |
| Front Barrel Temperature, °F. | 365-380 |
| Nozzle Barrel Temperature, °F. | 375-390 |
| Screw Speed, rpm | 70 |
| Injection speed, in/sec | 0.8 |
| Injection pressure, psig | 1645-2110 |
| Short size, inch | 2.9 |
| Cushion, inch | 0.320-0.225 |
| Hold time, second | 4 |
| Cooling time, second | 35 |

TABLE 8B

Extrusion Conditions

| | |
|---|---|
| Equipment | A single Brabender with 2-inch die and a compression ratio of 3:1 screw |
| Screw rpm | 40 |
| Zone 1 temperature, °F. (° C.) | 300 (149) |
| Zone 2 temperature, °F. (° C.) | 320 (160) |
| Zone 3 temperature, °F. (° C.) | 342 (172) |
| Die temperature, °F. (° C.) | 361 (183) |

TABLE 8C

Compression Molding Conditions

| | |
|---|---|
| For Thermal Conductivity and Specific Gravity Measurements | 6" × 6" × 0.125" plaque (15 × 15 × 0.32 cm) |
| Equipment | 150 Ton WABASH 18" × 18" (46 × 46 cm) |
| Sample thickness | 0.125 inches (0.32 cm) |
| Heating platen Temperature, Top, °F. | 365~370 (185-188° C.) |
| Heating platen Temperature, Bottom, °F. | 365~370 (185-188° C.) |
| Pre-heat (cycle time, s) | 5 |
| Ramp (cycle time, s) | 180 |
| Hold (cycle time, s) | 120 |
| Cooling (cycle time, s) | 900 |

Table 9 shows the formulations and the test results for Examples 20-22 formulated and then final-shaped by the three different means of Tables 8A-8C.

TABLE 9

| Example | | 20 | 21 | 22 |
|---|---|---|---|---|
| PVC Compound from Example A, wt. % | | 51.3 | 43.6 | 51.3 |
| Timrex 80 × 150 natural flake graphite, wt. % | | 44.2 | 52.6 | 22.1 |
| Timrex C-Therm 011 synthetic flake graphite, wt. % | | | | 22.1 |
| Epoxidized soybean oil (ESO), wt. % | | 4.5 | 3.8 | 4.5 |
| Total Weight % | | 100 | 100 | 100 |
| Test Results | | | | |
| In-plane thermal conductivity, W/(m · K) | Injection Molded | 10.1 | 12.6 | 10.1 |
| | Extruded | 9.7 | 10.2 | 10.7 |
| | Compression molded | 8.3 | 13.5 | 20 |
| Through-plane thermal conductivity, W/(m · K) | Injection Molded | 1.20 | 1.69 | 2.00 |
| | Extruded | 0.97 | 1.35 | 1.42 |
| | Compression molded | 0.73 | 0.79 | 1.26 |
| Specific gravity | Injection Molded | 1.61 | 1.68 | 1.61 |
| | Extruded | 1.59 | 1.67 | 1.61 |
| | Compression molded | 1.61 | 1.69 | 1.61 |
| Porosity, % | Injection molded | 0 | 0 | 0 |
| | Extruded | 0.6 | 0 | 0 |
| | Compression molded | 0 | 0 | 0 |
| Properties of the Injection Molded Samples | | | | |
| Tensile Modulus (ksi) (ASTM D638) | | 2225 | 3075 | 2554 |
| Tensile Strength (psi) (ASTM D638) | | 5200 | 4726 | 5809 |
| Flexural Modulus (ksi) (ASTM D790) | | 2370 | 2601 | 2624 |
| Flexural Strength (psi) (ASTM D790) | | 9614 | 8633 | 10494 |
| Notched Izod Impact (ft-lb/in) at 73° F. (ASTM D256) | | 0.52 | 0.47 | 0.34 |
| HDT (° C.) @ 264 psi (1.82 MPa), annealed (ASTM D648) | | 61 | 61 | 64 |
| HDT (° C.) @ 66 psi (0.45 MPa), annealed (ASTM D648) | | 64 | 66 | 69 |

In Table 4A, Comparative Example 1 vs. Examples 2-5 and Comparative Example 1 vs. Examples 6-7 demonstrated that an increasing amount of thermally conductive graphite filler increased both in-plane and through-plane thermal conductivity with relatively constant amount of ESO coupling agent to PVC compound for Examples 2-5 and 6-7 with Comparative Example 1 having none. These results showed the ESO in compression molding conditions did not measurably alter the thermal conductivity but did help milling compounding process so as to minimize the porosity of the resulting compression molded plaques.

Examples 3 and 7-10, with constant amount of ESO coupling agent and a constant amount of graphite demonstrated that different types of graphite, natural vs. synthetic and flake vs. spheroid, did affect the thermal conductivity values both in-plane and through-plane measurements.

Examples 12-16 on the one hand and Examples 17-18 on the other hand with a constant amount of ESO and a constant total amount of graphite with combination of different type graphite, demonstrated that the combination of different type graphite also showed different thermal conductivity values both in-plane and through-plane as compared with using a single type of graphite.

Examples 3 and 11 with a relative constant amount of graphite to PVC compound (about 86%) but a difference in amount of ESO demonstrated that a smaller amount of ESO in the formulation of Example 11 was able to achieve both minimal porosity and also a higher in-plane thermal conductivity, though a lower through-plane conductivity.

Example 19 continued the exploration of a formulation with ESO at the lower end of the preferred range and the use of natural flake graphite. The physical properties of the originating PVC compound were maintained acceptably in view of the addition of both the graphite flake and the ESO.

Examples 20-22 measured both in-plane and through-plain thermal conductivities after final shaping by injection molding, extrusion, and compression molding. Examples 20 and 21 shared the use of natural flake graphite in different amounts, and Example 22 used the same combination of graphites as in Example 16.

For both in-plane and through-plane thermal conductivity results, injection molding out-performed extrusion or compression molding for Example 20.

Example 21 found compression molding to be unexpectedly superior for in-plane thermal conductivity over injection molding and extrusion, but not so for through-plane thermal conductivity.

It is noted that the difference between Examples 20 and 21 is only nine more weight percent of the same natural graphite flake.

Example 22 provided yet additional unpredicted results, with the graphite being contributed half and half, as was done in Example 16. The compression molded plaque had an in-plane thermal conductivity of 20 W/(m·K), near the sum of the compression molding, in-plane thermal conductivities for Examples 20 and 21 (20 vs. 8.3+13.5). Nearly the same effect was achieved for through-plane thermal conductivities: (1.26 vs. 0.73+0.79).

Table 9 also demonstrated substantial retention of physical properties of the PVC compound of Example A with minimal porosity because of the presence of the ESO coupling agent.

Finally, Table 9 reporting the formulations of Examples 20-22 and their thermal conductivity properties demonstrated the unexpected result that each of these three formulations can be shaped into any one of extrusion, compression molding, and injection molding. Thus, a single formulation or grade of a commercial product in pellet or cube form can be melted into final polymer article via any of the three shaping methods. If ESO were not present, as seen in Comparative Example 1 compared with Examples 2-22, the pelletization process could not be completed successfully even before molding and extrusion. If there were to be extrusion or injection molding, the resulting product would have such porosity that thermal conductivity would be lower. The ESO facilitates the practical elimination of voids during processing, pelletization, and final shaping. Without practical elimination of those voids, thermal conductivity would suffer.

The practical elimination of voids for the actual specific gravity to nearly match ideal specific gravity (a porosity of less than one percent) occurs in spite of the fact there is a large quantity of graphite being processed into the polyvinyl chloride resin to achieve the desired thermal conductivity in the final polymer article. The ratio of the amount of graphite to the amount of polyvinyl chloride resin can range from 0.22:1 to 1.33:1 (graphite:PVC resin) and preferably can range from 0.60:1 to 0.75:1. Each ratio for Examples 2-22 is calculated by dividing the weight percent of the graphite by the weight percent of the polyvinyl chloride polymer in 86% of the polymer compound into which the graphite is mixed, because the polymer resin is approximately 86% of the polymer compound, as calculated in Table 2. These high loadings of graphite for thermal conductivity reasons are successfully coupled into the PVC resin within minimal porosity because of the use of the epoxidized vegetable oil.

While all of the experiments have been conducted using ESO as the epoxidized vegetable oil for reasons of direct comparison logic, it is to be understood that any of the other epoxidized vegetable oils identified above are likely as capable as ESO of providing sufficient coupling for graphite to be loaded into PVC compounds at the weight percents exemplified above to achieve good processing and good ultimate thermal conductivity after final shaping.

By these observations and others utilizing the data of the Tables 4 and 9, one having ordinary skill in the art without undue experimentation can tailor the combination of types of graphite, the type of final shaping, and the amounts of graphite and ESO to achieve nearly any in-plane or thorough-plane thermal conductivity value within the range of results demonstrated above.

All documents cited in the Embodiments of the Invention are incorporated herein by reference in their entirety unless otherwise specified. The citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of the present invention.

What is claimed is:

1. A polyvinyl halide compound having thermal conductivity, comprising:
   polyvinyl halide resin;
   natural or synthetic graphite of flake or spheroid form; and
   at least 0.5 and less than or equal to 6.4 weight percent of epoxidized vegetable oil;
   wherein the polyvinyl halide compound has a heat distortion temperature of at least 65° C. at 66 psi, measured according to ASTM D648.

2. The polyvinyl halide compound of claim 1, wherein the polyvinyl halide compound comprises natural flake graphite.

3. The polyvinyl halide compound of claim 1, wherein the polyvinyl halide resin comprises polyvinyl chloride.

4. The polyvinyl halide compound of claim 3, wherein the amount of graphite present in the polyvinyl halide compound is from about 15 to about 65 weight percent of the polyvinyl halide compound.

5. The polyvinyl halide compound of claim 3, wherein the amount of epoxidized vegetable oil present in the polyvinyl halide compound is from 1 to 6 weight percent of the polyvinyl halide compound.

6. The polyvinyl halide compound of claim 5, wherein the epoxidized vegetable oil is epoxidized soybean oil.

7. The polyvinyl halide compound of claim 5, wherein the polyvinyl halide compound also comprises at least one additive selected from the group consisting of adhesion promoters; biocides; anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; processing aids; release agents; silanes, titanates and zirconates; slip and anti-blocking agents; stabilizers; stearates; ultraviolet light absorbers; viscosity regulators; waxes; and combinations thereof.

8. The polyvinyl halide compound of claim 1, wherein the graphite is selected from the group consisting of natural flake graphite, synthetic flake graphite, synthetic spheroid graphite, and combinations thereof.

9. The polyvinyl halide compound of claim 8, wherein the amount of graphite present in the polyvinyl halide compound is from about 30 to about 55 weight percent of the polyvinyl halide compound.

10. The polyvinyl halide compound of claim 1 in the form of an extruded polymer article, a compression molded polymer article, or an injection molded polymer article.

11. A polymer article comprising the polyvinyl halide compound of claim 1.

12. The polymer article of claim 11, wherein the polymer article has a porosity of less than one percent, wherein porosity is calculated based on specific gravity, measured according to ASTM D792, and theoretical specific gravity.

13. The polymer article of claim 11, wherein the polymer article has a Notched Izod impact resistance of 0.3-1.5 ft-lb/in at 73° F. measured according to ASTM D256.

14. The polyvinyl halide compound of claim 1, wherein the polyvinyl halide compound contains no copolymerized co-monomer or contains copolymerized co-monomer in an amount of less than 5 weight percent.

15. The polyvinyl halide compound of claim 1, wherein the ratio of the amount of graphite to the amount of polyvinyl halide resin is from 0.22:1 to 1.33:1 by weight.

16. The polyvinyl halide compound of claim 3, wherein the ratio of the amount of graphite to the amount of polyvinyl chloride resin is from 0.22:1 to 1.33:1 by weight.

17. The polyvinyl halide compound of claim 16, wherein the polyvinyl halide compound contains no copolymerized co-monomer or contains copolymerized co-monomer in an amount of less than 5 weight percent.

18. The polyvinyl halide compound of claim 2, wherein the polyvinyl halide compound further comprises synthetic flake graphite.

19. The polyvinyl halide compound of claim 1,
wherein the polyvinyl halide compound has an in plane thermal conductivity of greater than 1.0 W/(m*K), wherein in plane thermal conductivity is calculated from heat capacity and diffusivity measured according to ASTM D1461-01.

20. A polyvinyl halide compound having thermal conductivity, comprising:
polyvinyl halide resin;
natural or synthetic graphite of flake or spheroid form; and
at least 0.5 and less than or equal to 6.4 weight percent of epoxidized vegetable oil;
wherein the polyvinyl halide compound has a Notched Izod impact resistance of 0.3-1.5 ft-lb/in at 73° F. measured according to ASTM D256.

21. The polyvinyl halide compound of claim 20, wherein the polyvinyl halide compound comprises natural flake graphite.

22. The polyvinyl halide compound of claim 21, wherein the polyvinyl halide compound further comprises synthetic flake graphite.

23. The polyvinyl halide compound of claim 20, wherein the polyvinyl halide resin comprises polyvinyl chloride.

24. The polyvinyl halide compound of claim 20, wherein the amount of graphite present in the polyvinyl halide compound is from about 15 to about 65 weight percent of the polyvinyl halide compound.

25. The polyvinyl halide compound of claim 20, wherein the amount of epoxidized vegetable oil present in the polyvinyl halide compound is from 1 to 6 weight percent of the polyvinyl halide compound.

26. The polyvinyl halide compound of claim 20, wherein the polyvinyl halide compound also comprises at least one additive selected from the group consisting of adhesion promoters; biocides; anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; processing aids; release agents; silanes, titanates and zirconates; slip and anti-blocking agents; stabilizers; stearates; ultraviolet light absorbers; viscosity regulators; waxes; and combinations thereof.

27. The polyvinyl halide compound of claim 20, wherein the graphite is selected from the group consisting of natural flake graphite, synthetic flake graphite, synthetic spheroid graphite, and combinations thereof.

28. The polyvinyl halide compound of claim 20, wherein the polyvinyl halide compound contains no copolymerized co-monomer or contains copolymerized co-monomer in an amount of less than 5 weight percent.

29. The polyvinyl halide compound of claim 20, wherein the ratio of the amount of graphite to the amount of polyvinyl halide resin is from 0.22:1 to 1.33:1 by weight.

30. A polyvinyl halide compound having thermal conductivity, comprising:
polyvinyl halide resin;
natural or synthetic graphite of flake or spheroid form; and
at least 0.5 and less than or equal to 6.4 weight percent of epoxidized vegetable oil;
wherein the polyvinyl halide compound contains essentially no additional plasticizer.

31. The polyvinyl halide compound of claim 30, wherein the polyvinyl halide compound comprises natural flake graphite.

32. The polyvinyl halide compound of claim 31, wherein the polyvinyl halide compound further comprises synthetic flake graphite.

33. The polyvinyl halide compound of claim 30, wherein the polyvinyl halide resin comprises polyvinyl chloride.

34. The polyvinyl halide compound of claim 30, wherein the amount of graphite present in the polyvinyl halide compound is from about 15 to about 65 weight percent of the polyvinyl halide compound.

35. The polyvinyl halide compound of claim 30, wherein the amount of epoxidized vegetable oil present in the polyvinyl halide compound is from 1 to 6 weight percent of the polyvinyl halide compound.

36. The polyvinyl halide compound of claim 30, wherein the polyvinyl halide compound also comprises at least one additive selected from the group consisting of adhesion promoters; biocides; anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; processing aids; release agents; silanes, titanates and zirconates; slip and anti-blocking agents; stabilizers; stearates; ultraviolet light absorbers; viscosity regulators; waxes; and combinations thereof.

37. The polyvinyl halide compound of claim 30, wherein the graphite is selected from the group consisting of natural flake graphite, synthetic flake graphite, synthetic spheroid graphite, and combinations thereof.

38. The polyvinyl halide compound of claim 30, wherein the polyvinyl halide compound contains no copolymerized co-monomer or contains copolymerized co-monomer in an amount of less than 5 weight percent.

39. The polyvinyl halide compound of claim 30, wherein the ratio of the amount of graphite to the amount of polyvinyl halide resin is from 0.22:1 to 1.33:1 by weight.

\* \* \* \* \*